United States Patent

[11] 3,612,842

| [72] | Inventors | Takashi Aga;<br>Masami Yamanaka, both of Hyogo-ken, Japan |
|---|---|---|
| [21] | Appl. No. | 810,629 |
| [22] | Filed | Mar. 26, 1969 |
| [45] | Patented | Oct. 12, 1971 |
| [73] | Assignee | Yamato Scale Company, Limited Hyogo-ken, Japan |
| [32] | Priority | Sept. 5, 1968 |
| [33] | | Japan |
| [31] | | 43-63909 |

[54] PRICE COUNTING BALANCE
3 Claims, 9 Drawing Figs.

[52] U.S. Cl. ..................................................235/151.33,
  177/3
[51] Int. Cl. ..................................................... G01g 9/00,
  G06f 15/20
[50] Field of Search...........................................235/151.33;
  177/3

[56] References Cited
UNITED STATES PATENTS

| 2,974,863 | 3/1961 | Williams, Jr. et al. | 235/151.33 |
| 3,205,956 | 9/1965 | Bell et al. | 235/151.33 X |
| 3,315,067 | 4/1967 | Bell et al. | 235/151.33 |
| 3,458,692 | 7/1969 | Susor | 235/151.33 |

*Primary Examiner*—Malcolm A. Morrison
*Assistant Examiner*—Edward J. Wise
*Attorney*—Eugene E. Geoffrey, Jr.

ABSTRACT: A price counting balance utilizing electronic means for producing an indication of total weight or price of a commodity. The electronic means utilizing a patterned strip for producing a pulse train with the pulse train being arranged to provide a pulse corresponding to the price for each unit weight.

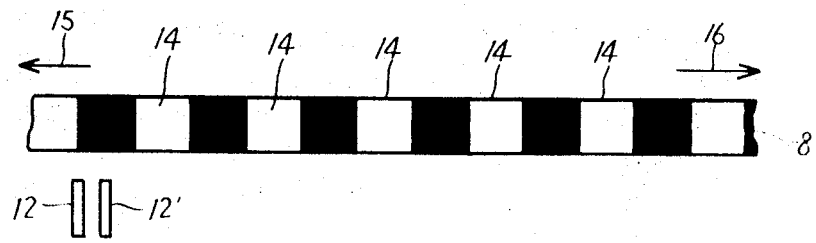
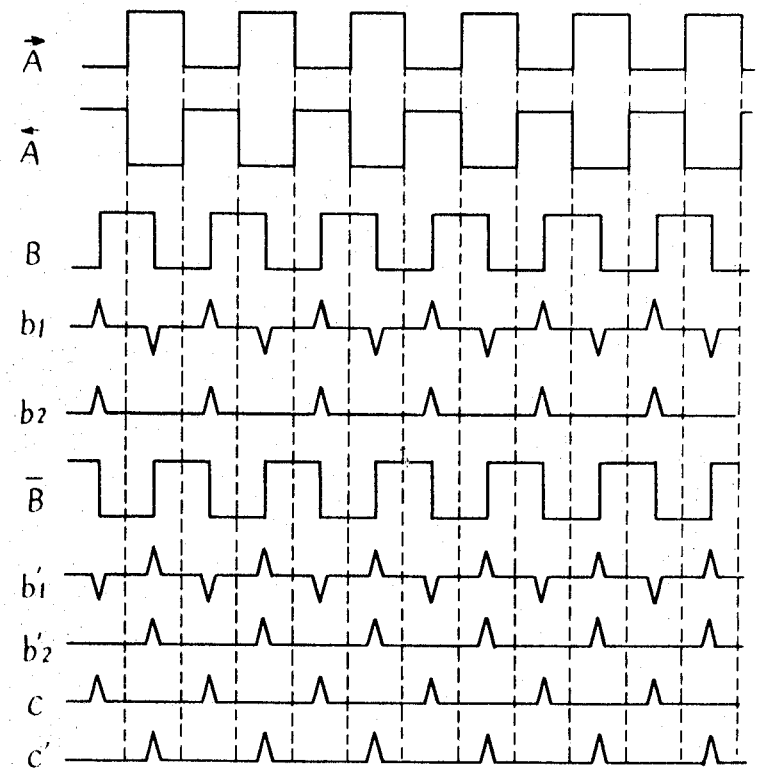
Fig.3

PRICE COUNTING BALANCE

This invention relates to a price counting balance and more specticially to a novel and improved balance arranged to indicate the total weight and price of a commodity by converting the weight of the commodity into a pulse train wherein each pulse of the train represents the price per unit weight of the commodity. For convenience the price per unit weight shall be hereinafter referred to as "unit price."

In prior known price counting balance devices utilizing a binary coded decimal code plate, the plate is rotated by the load or weight and the angle of rotation is derived as a binary coded decimal code. The resultant computation is then multiplied by the unit price to obtain the price of the commodity. Such prior devices have not been found entirely satisfactory since the construction of the code plate is complicated, and it is difficult to calculate the total sum of the prices of commodities having different unit prices.

This invention overcomes the disadvantages of prior known devices and provides a novel and improved price counting balance which is characterized by its simplicity, ease of manufacture and relatively low cost.

Still another object of the invention resides in the provision of a novel and improved price counting balance having means for readily calculating the total cost of commodities having different unit prices.

The above and other objects of the invention will become more apparent from the following description and accompanying drawings forming part of this application.

In the drawings:

FIG. 3 illustrates a fragmentary section of a code plate in accordance with the invention and the signals produced by displacement of the code plate to produce the computations;

Figure 1:
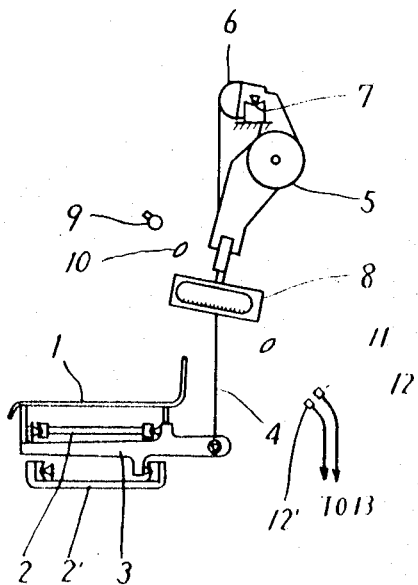
FIG. 1 is a schematic diagram representing the structure of the mechanical portion of a price counting balance in accordance with the invention.

The price counting balance in accordance with the invention utilizes a weighing mechanism for weighing a commodity. A code plate having a striped pattern thereon is moved by the weighing mechanism. The code plate is utilized to produce a train of pulses as it is displaced by the weighing mechanism, and these coded portions are utilized in the computation of the price of the commodity. The apparatus further includes unit-price-setting means, an addition and subtraction circuit which receives the unit price signal as well as pulses of said train to produce an output signal indicating the total price of the commodity being weighed. More specifically, and with reference to FIG. 1, the numeral 1 denotes a cradle upon which a commodity to be weighed is placed. The cradle is supported by arms 2, 2', and 3 with the arm 3 constituting the main arm which is displaced a distance proportional to the weight of the commodity placed on the cradle. The right-hand end of the arm 3 as viewed in FIG. 1 is coupled by a steel strip 4 to a cam 6 which forms part of a pendulum 5. When a load or weight is placed on the cradle 1, the pendulum 5 swings about the fulcrum 7 until a balance is obtained. The shape of the cam 6 is determined so that the angle swing of the pendulum 5 is proportional to the load or weight placed on the cradle 1. The lower end of the pendulum 5 carries a code plate 8 which may be formed of a transparent material having a striped pattern thereon. A light beam is projected from the light source 9 through the lens 10 and onto the code plate 8. Light passing through the code plate 8 is converged by a lens 11 onto photoelectric elements 12 and 12'. The photoelectric elements generate pulses proportional to the movement of the plate 8 as the latter is displaced by the load or weight on the cradle 1. The utilization of two photoelectric elements 12 and 12' enables the production of a discriminating signal which is used for addition or subtraction in accordance with the direction of swing of the code plate 8.

Figure 2:
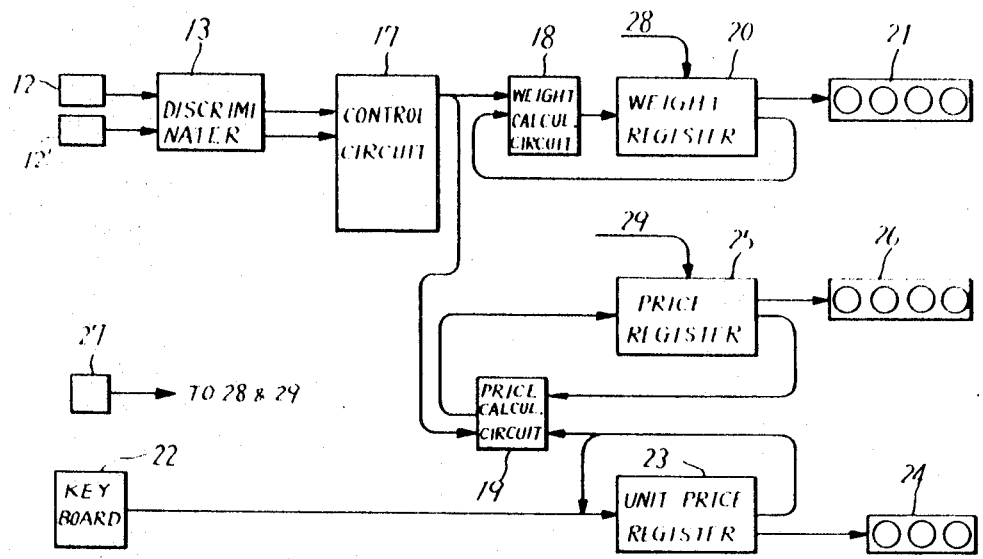
FIG. 2 is a block diagram illustrating the computing portion of the price counting balance in accordance with the invention.

FIG. 2 is a block diagram of the computing apparatus and receives output pulses from the photoelectric elements 12 and 12'. These signals are fed to the addition and subtraction discriminator 13 as will be described more clearly in connection with FIG. 3. In the instant embodiment of the invention, the photoelectric cells 12 and 12' are arranged at intervals equal to a quarter pitch of the pattern 14 as shown on the strip illustrated in FIG. 3. This corresponds to 90° in phase. When a commodity is placed on the cradle 1, there is some oscillation of the cradle as in the case of a normal scale with the result that the code plate 8 will also oscillate. For the purposes of this description, it will be assumed that when the code plate 8 moves to the left as shown by the arrow 15 in FIG. 3, the cradle is moving downwardly and that when the code plate moves to the right as indicated by the arrow 16 of FIG. 3, the cradle is moving upwardly.

Assuming that the cradle 1 is moving downwardly and the code plate 8 is moved in the direction of the arrow 15, the photoelectric element 12 will generate a series of pulses $\vec{A}$ and the photoelectric element 12' will generate a series of pulses B. The pulses B will lead the pulses A in phase by about 90°. If the pulses B are differentiated by a differential circuit in the discriminator circuit 13, a series of pulses $b1$ will be produced. By rectifying pulses $b1$, a series of pulses $b2$ is provided. If the cradle 1 moves upwardly the code plate 8 moves in the direction of arrow 16 as shown in FIG. 3, the photoelectric cell 12 generates a series of pulses $\overleftarrow{A}$ which leads the pulses B by about 90°, and the photoelectric element 12' generates a pulse signal $b'1$ delayed in phase by 90° from the corresponding pulse signal produced by the photoelectric element 12. This pulse signal which has been differentiated in the discriminator 13 is then rectified and becomes a series of unidirectional pulses $b'2$.

In the event of the pulse signal $\vec{A}$ and the signal $b2$ are produced and then applied to an AND circuit, an addition command signal C is then generated. Should the pulse signal $\overleftarrow{A}$ and the signal $b'2$ be applied to an AND circuit, a subtraction command signal C' is generated. A conventional discriminator such as that shown in FIG. 4 may be used as the discriminator of the present counter. With the circuit arranged as above, the discriminator circuit 13 will provide a control circuit 17 with a discrimination signal of addition or subtraction each time the direction of swing of the pendulum 5 changes.

The control circuit 17 generates an operation command pulse each time an addition or subtraction command signal C or C' is produced and feeds it together with the addition or subtraction discrimination signal to the weight-calculating circuit 18 and the price-calculating circuit 19, respectively. The weight-calculation circuit 18 adds or subtracts the operation command pulse supplied from the control circuit 17 and causes the weight register 20 to store the result. The stored information in the weight register is then indicated by the weight-indicating means 21. A key board 22 is provided for setting the unit price of the commodity. A signal corresponding to the unit price is then stored in the unit price register 23 and at the same time the unit price is indicated by the price-indicating means 24. The unit price information stored in the unit price register is also supplied to the price-calculating circuit 19.

The price-calculating circuit 19 forms addition and subtraction operations in accordance with the information stored in the unit price register 23 each time an operation command pulse is applied from the control circuit 17. The final result of the computing operation when the cradle 1 has come to rest is stored in the price register 25 and at the same time is fed to the price-indicating means 26. Since in this case the operation command pulses are generated precisely in response to the pulsed signal A which indicates the weight of the commodity, the price register 25 will produce the product of the unit price and the weight of the commodity, thus indicating the total price of the commodity.

Inasmuch as the price counting balance of the invention described above involves both weight calculation and price calculation and addition and subtraction operations are automatically effected as the pendulum 5 oscillates upon placement of a commodity on the cradle 1, when the pendulum comes to rest, the weight-indicating means will indicate the weight of the commodity and the price-indicating means will indicate the price of the commodity. When the commodity is removed from the cradle 1, the pendulum 5 will return to a zero position whereupon both the weight and the price are subtracted and both indicating means 21 and 26 will indicate zero. Let it be assumed that the unit price of a commodity in the unit price register is the price per gram and each weight pulse corresponds to one gram. The price-calculation circuit 19 will execute addition and subtraction operations for each unit weight pulse. If the weight pulses indicate 2 grams, it is necessary to execute addition or subtraction twice for each weight pulse and such operations are executed by the control circuit 17 and the price-calculating circuit 19.

As described above, the price counting balance with this invention is arranged to add or subtract the unit price in accordance with the weight pulses produced when the code plate 8 is moved by the weight of the commodity on the cradle 1. As a result, the computing apparatus in accordance with the invention can be simplified since a simple addition and subtraction circuit may be utilized. Moreover, if a commodity is placed on the cradle 1 and thereafter a part is removed or in the alternative the quantity of the commodity is increased, a total weight and price will be immediately indicated. It is possible to add a second commodity having a different unit price than the first commodity and record the total cost.

In actual practice, it is convenient to provide the price counting balance with a tare key 27 which upon actuation will automatically cause the weight register 20 and the price register 25 to be reset to zero. With this arrangement should a container be placed on the cradle 1 and then the tare key depressed, the apparatus will then register the actual net weight and price of the commodity itself.

FIGS. 4 through 9 show concrete examples of the addition and subtraction discriminator 13, control circuit 17, weight-calculation circuit 18 and price-calculation circuit 19 of the block diagram of the present invention as shown in FIG. 2.

Figure 4:
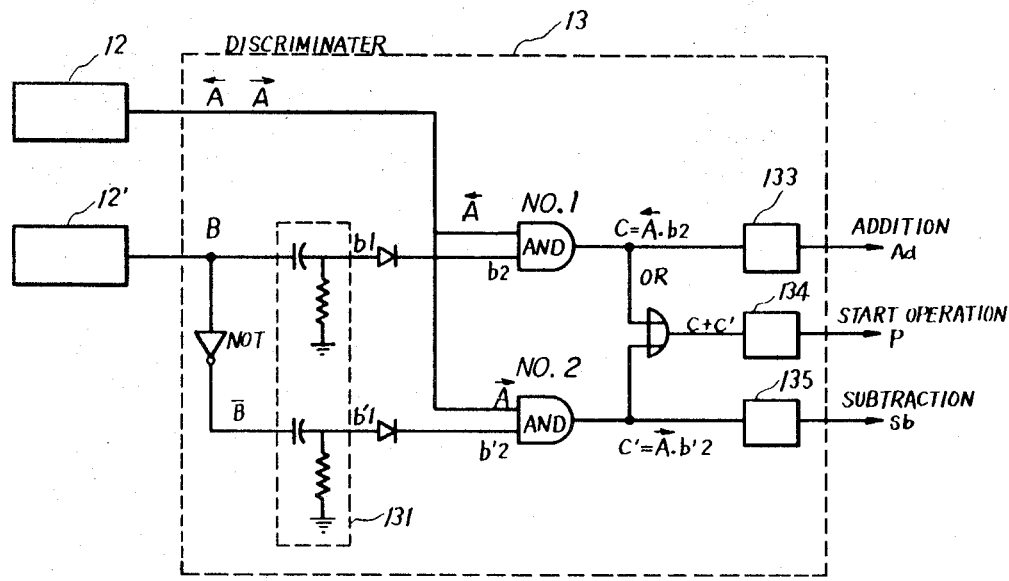
FIG. 4 is a schematic circuit diagram representing an embodiment of the addition and subtraction discriminator 13 in FIG. 2.

Referring now to FIGS. 3 and 4, signals A and B generated by the photoelectric elements 12 and 12' respectively in response to movement of the code plate 8 are applied to the addition and subtraction discriminator 13. As previously described in conjunction with FIG. 3, the signals B and B̄ are differentiated by a differential circuit 131 into signals denoted as $b1$ and $b'1$ in FIG. 3 and further rectified into signals $b2$ and $b'2$. In response to the changes in the direction of the swing of the pendulum 5 the signals $\overset{\leftrightarrow}{A}$ and $b2$, and $\overset{\leftrightarrow}{A}$ and $b'2$ are supplied to respective AND gates 01 and 02 in successive cycles and produce the addition and subtraction signal pulses C and C'. The signals C and C' are added in an OR gate, then shaped in a monostable multivibrator circuit 134 into a pulse having a specific width and transferred to the next stage as a start operation command signal P. The addition and subtraction signals C and C' are also shaped into pulses having desired widths by monostable multivibrator circuits 133 and 135 respectively and then transferred to the addition and subtraction circuit as addition and subtraction command signals Ad and Sb.

Figure 5:
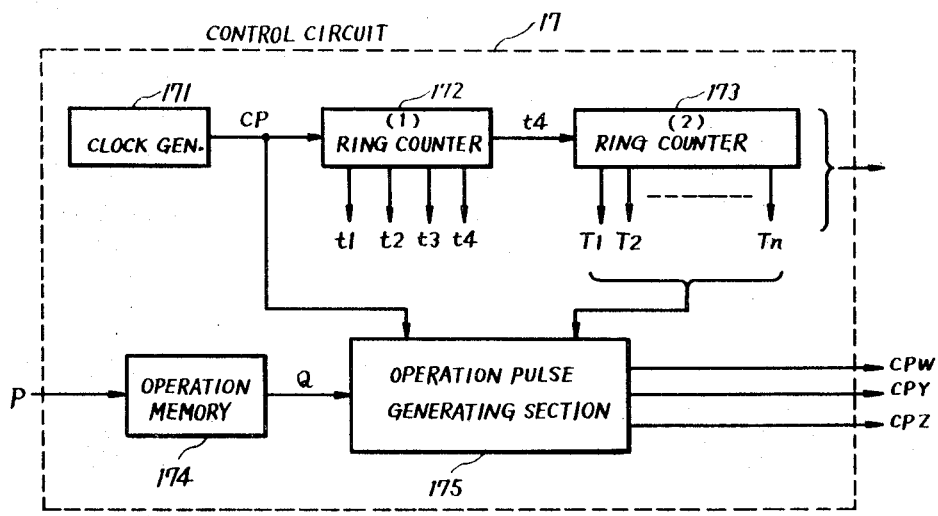
FIG. 5 is a schematic circuit diagram representing an embodiment of the control circuit 17 in FIG. 2.
Figure 6:
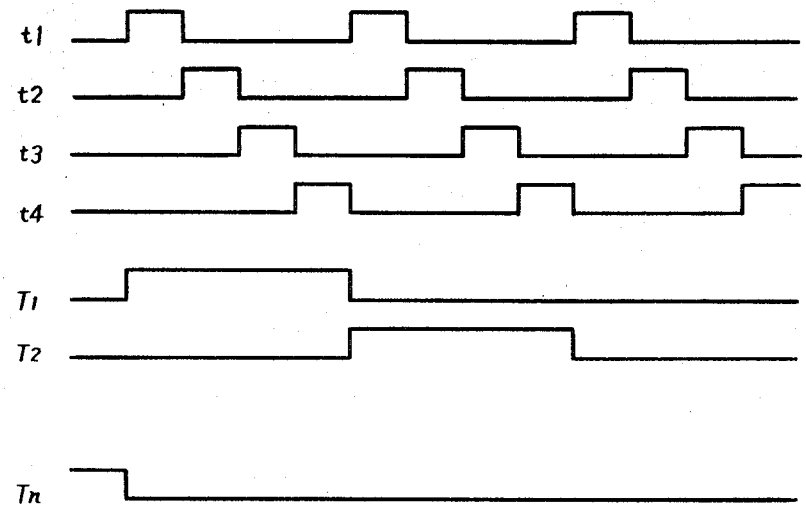
FIGS. 6 and 7 are signal waveform diagrams relating to the operation of the control circuit of FIG. 5.

Referring to FIG. 5, the control circuit 17 may be of a conventional type which includes a timing-signal-generating circuit and an operation-pulse-generating circuit. A signal CP derived from a clock pulse generator 171 is applied to a first ring counter 172 to generate bit timing signals $t1$, $t2$, $t3$, and $t4$. A second ring counter 173 in the next stage is shifted by one step at each cycle of the first ring counter 172 to generate digit timing signals T1, T2,...Tn. These timing signals appear in time relation as shown in FIG. 6 and are used for dynamic indication and operation-pulse generation.

Figure 7:
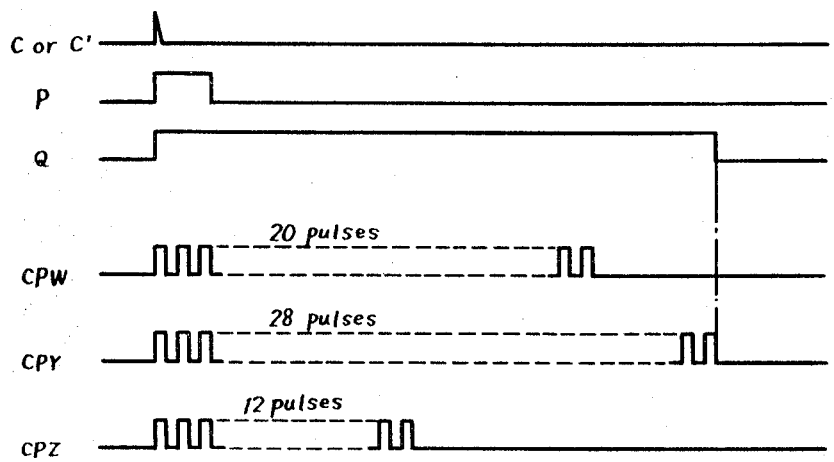

When the code plate 8 moves even a short distance and only one pulse is generated, the start-operation command P occurs and is fed to an operation memory circuit 174. In operation, as shown in FIG. 7, if the start-operation command P is applied to the pulse-generating signal Q and maintains it until a cycle of operation is completed even if the signal P disappears. The signals Q and CP are supplied to an operation-pulse-generating section 175 together with the digit timing signals T1, T2,...Tn and produce three pulse trains CPW, CPY, and CPZ, respectively. These output pulses CPW, CPY and CPZ serve to drive the weight register 20, price register 25 and unit price register 23, respectively, and include 20, 28, and 12 pulses when the above registers 20, 25 and 23 are four-digit, four-digit, and three-digit registers, respectively. (The number of pulses in each pulse train depends on the number of digits to be indicated.)

Figure 8:
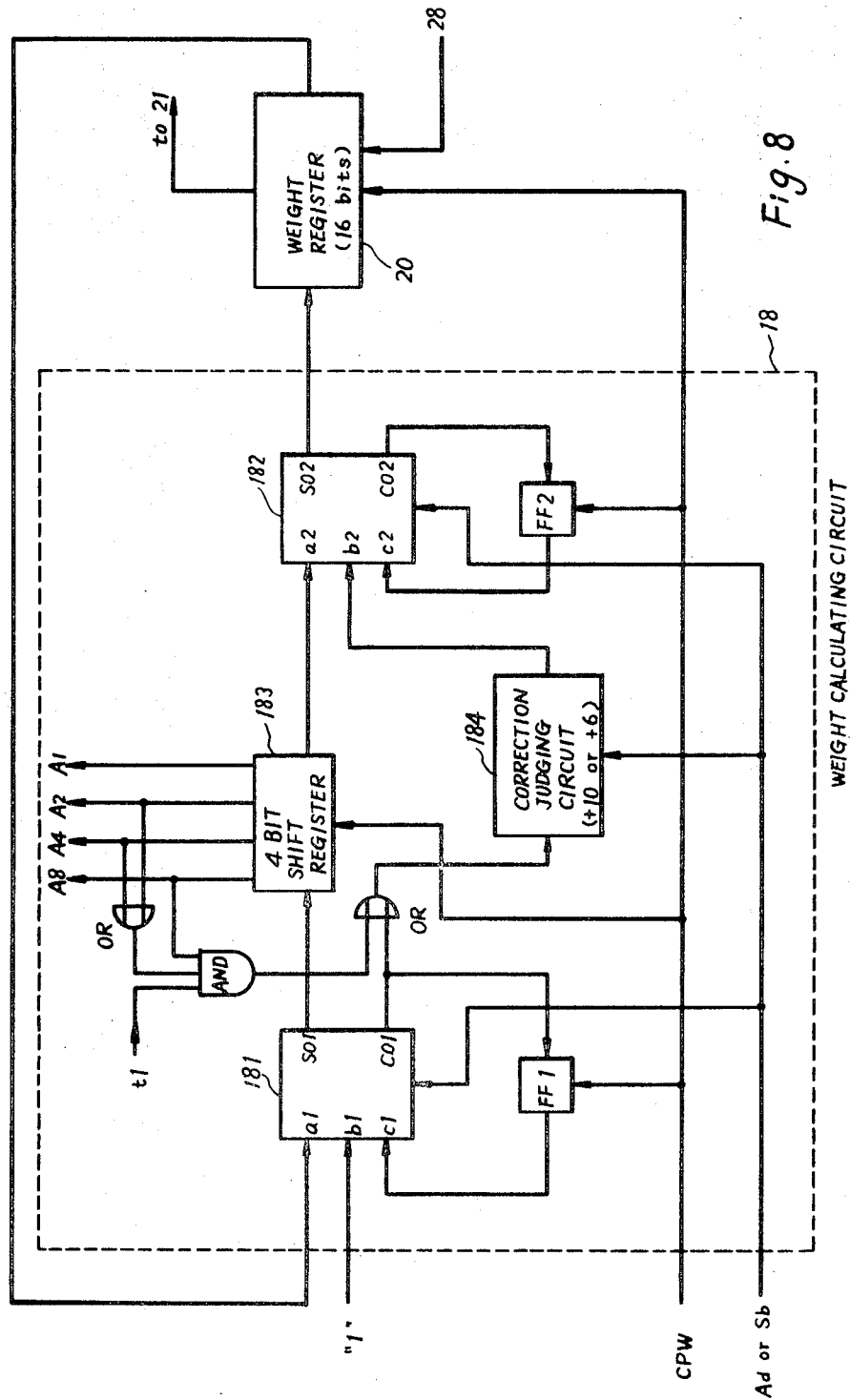
FIG. 8 is a schematic circuit diagram representing an embodiment of the weight-calculation circuit 18 in FIG. 2.

The weight-calculation circuit 18 and the weight register 20 may be of a conventional type shown in FIG. 8 which includes a full adder and subtractor circuit for binary-coded decimal signals is shown within the block 18 enclosed by broken lines and the output signal is delayed by one digit with respect to the input signal since a 4-bit shift register 183 is included therein. This full adder and subtractor circuit is well known in the art of table computers and includes a pair of full adders and subtractors 181 and 182, the 4-bit register 183 and a correction judging circuit 184.

In operation, the full adder and subtractor 181 in the forestage effects addition and subtraction of two numbers and supplies the result to the 4-bit register 183 which detects whether it is more than 10 or less than zero. Then a correction of +10 or +6 is effected in the full adder and subtractor 182 in the backstage to provide a perfect binary-coded decimal code to be transferred to the next stage. When the weight varies and the start-operation command P occurs, 20 clock pulses CPW for driving the weight register 20 are produced and the content of the weight register 20 is thereby shifted to the right and completes one circulation. Since a fixed number signal "1" is applied to an input $b1$ of the full adder and subtractor 181, the following calculation is effected during the circulation of the content of the weight register 20.

$$W = W \pm 1$$

However, since the calculation of (W+1) is effected in the case of addition and the calculation of (W−1) is effected in the case of subtraction, the content of the weight register 20 varies by 1 gram toward the direction of change of the weight when the weight varies by 1 gram. Therefore, the whole configuration of FIG. 8 may be considered as a counter having a register. While this counter performs one circulation in response to 20 clock pulses CPW, there is no problem or erroneous operation since the time which is taken for one circulation is designed to be sufficiently shorter than the pulse (P) interval when the code plate moves at the maximum speed.

As described above, addition and subtraction operations are effected in accordance with the direction of movement while the code plate continues to sway and when the balance is attained, the value of the weight at that time is stored in the register and can be immediately indicated.

Figure 9:
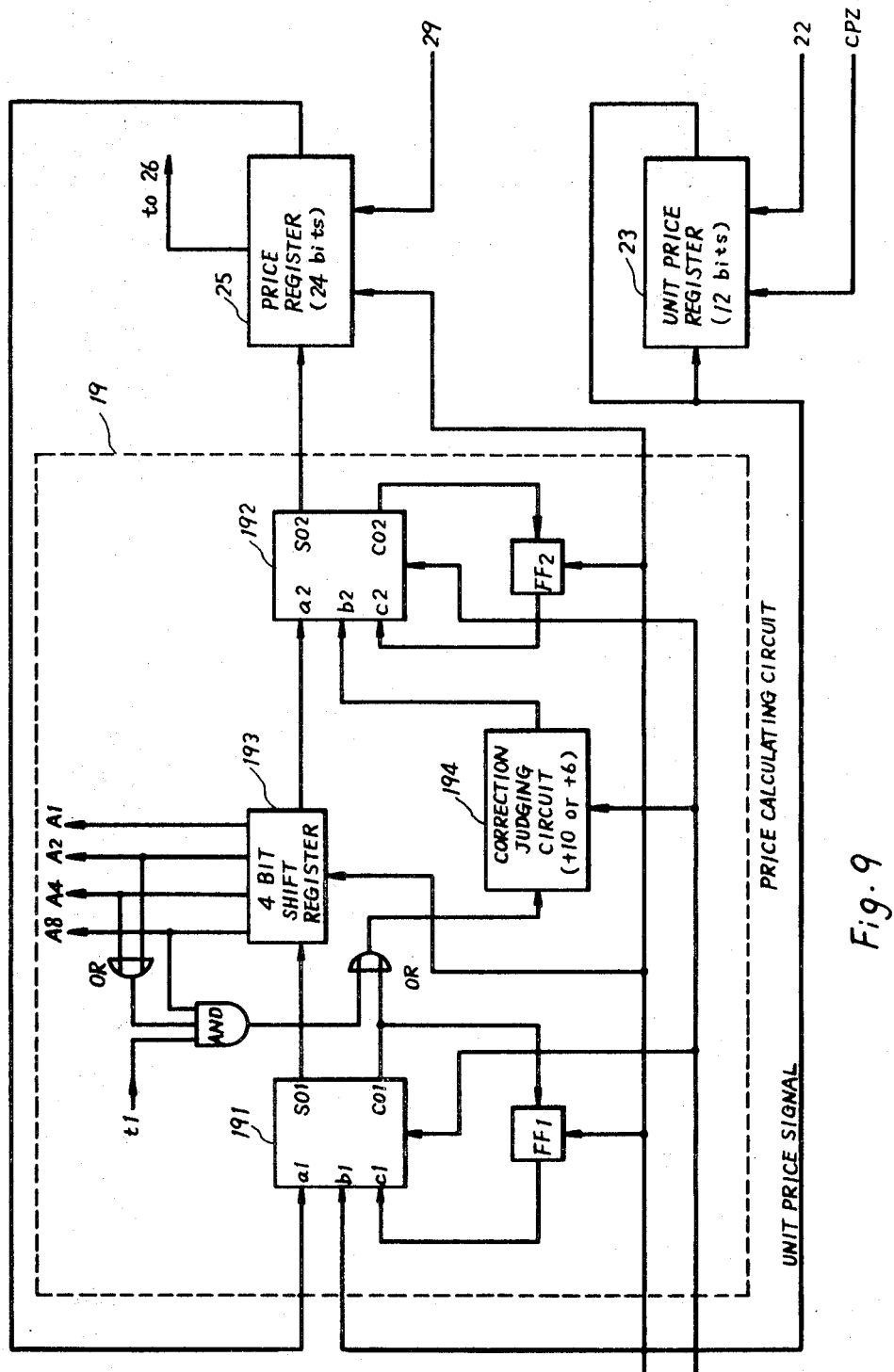
FIG. 9 is a schematic circuit diagram representing an embodiment of the price-calculation circuit 19 in FIG. 2.

Referring to FIG. 9 representing the price-calculation circuit 19, the price register 25 and the unit price register 23, the block 19 includes a full adder and subtractor circuit which is essentially the same as that of FIG. 8 and a detailed explanation is not deemed necessary. This circuit effects a calculation, $$Y = Y \pm Z$$

where $Y$ is the content of the price register 25, $Z$ is the content of the unit price register 23 and the double sign ($\pm$) is determined in accordance with the direction of movement of the code plate of the balance.

When the start operation command P is generated, clock signals CPY and CPZ each having the number of pulses necessary for one circulation of the each register are simultaneously generated. Thus, the unit price in the unit price register 23 is added to or subtracted from the content of the price register 25. More specifically, the unit price per gram of weight is added or subtracted from the content of the register 25 with each change of 1 gram of the balance.

As described above, every time the code plate moves to generate the pulses, the registers circulate once, repeat addition and subtraction operations and effect an operation substantially the same as that of multiplication of the unit price and the weight, thus performing calculation of the price.

While, in the above description, one pulse generated from the balance corresponds to 2 or 5 grams, it may be arranged that one P signal produces two or five Q signals in order to circulate the registers in FIGS. 8 and 9 two or five times as the case may be.

In FIGS. 8 and 9, the bit numbers of the weight register 20 and the price register 25 appear respectively greater by 4 bits than those of the practical circuit for convenience of explanation. However, since the full adder and subtractor circuit includes a 4-bit register, if the most significant digit is substituted therefor, they can be reduced by 4 bits and the numbers of pulses CPW and CPY can also be reduced by 4 bits respectively.

The foregoing description involves a single embodiment of the invention, and it is of course evident that changes and modifications can be made without departing from the spirit and scope thereof.

What is claimed is:

1. Price counting weighing apparatus comprising a weighing mechanism for measuring the weight of a commodity, a code plate, electrical means associated with said code plate to produce a train of pulses upon relative movement between said plate and said electrical means, means coupled to said weighing mechanism to effect relative movement between said plate and said electrical means, unit-price-setting means for producing a signal corresponding to the unit price of the commodity being weighed, an addition and subtraction circuit connected to said price-setting means and said electrical means for adding and subtracting said unit price signal as said code plate is displaced in one direction and the other until said weighing mechanism attains a position of rest and price-indicating means indicating the results of said additions and subtractions when the weighing mechanism is at rest.

2. Price counting weighing apparatus according to claim 1 wherein said code plate has a striped pattern thereon, said electrical means constitutes a light source and at least two photocells displaced one relative to the other and discriminating means connected to said addition and subtraction circuit to produce addition and subtraction command signals in response to the direction of movement of said code plate.

3. Price counting apparatus according to claim 2 including a tare key to reset the price indicating means to compensate for the weight of a container for the commodity.